UNITED STATES PATENT OFFICE.

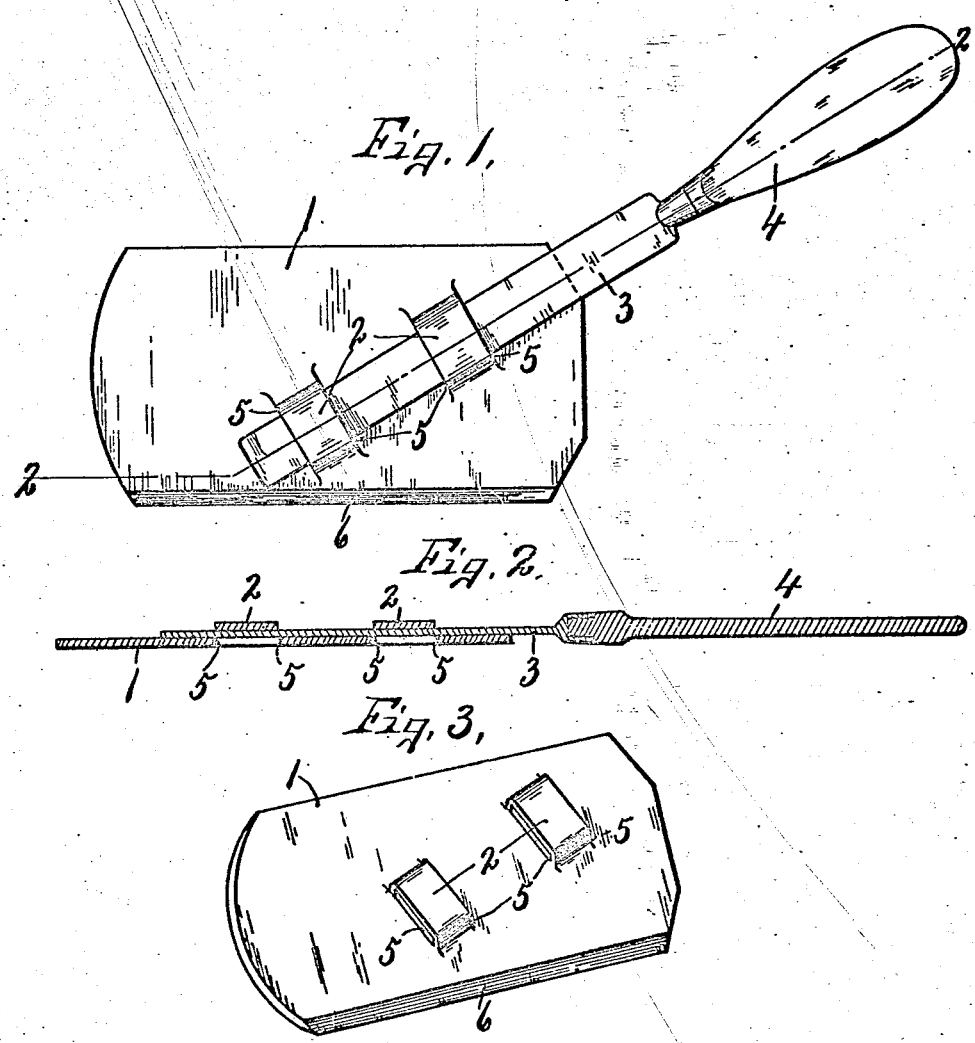

S SPENCER ECCLESTON, OF SYRACUSE, NEW YORK, ASSIGNOR OF ONE-HALF TO GURNSEY B. WILLIAMS, OF SYRACUSE, NEW YORK.

CAKE-TURNER.

No. 895,352.   Specification of Letters Patent.   Patented Aug. 4, 1908.

Application filed January 26, 1907. Serial No. 354,247.

*To all whom it may concern:*

Be it known that I, S SPENCER ECCLESTON, of Syracuse, in the county of Onondaga, in the State of New York, have invented new and useful Improvements in Cake-Turners, of which the following, taken in connection with the accompanying drawings, is a full, clear, and exact description.

This invention relates to an improved cake turner for inverting griddle cakes, meats, and other eatables which require manipulation during the process of cooking.

My object is to provide a comparatively broad, but thin flat metal blade with suitable attaching elements for receiving a somewhat narrower blade having a handle whereby the broader blade may be manipulated.

Another object is to construct the attaching elements of the broader blade so that it may be made as a separate article of manufacture and used with an ordinary case knife.

A further object is to provide the broad blade with a cutting edge adapted to be used for separating the cakes, or dividing other eatables during the process of the cooking, and to enable the entire device to be used in chopping vegetables, meats and other edibles.

Other objects and uses relating to the specific construction and arrangement of the parts of the cake turner will be brought out in the following description.

In the drawings—Figure 1 is a face view of one form of my improved cake turner adapted to be also used as a cutter or chopping device. Fig. 2 is a sectional view taken on line 2—2, Fig. 1. Fig. 3 is a perspective view of the detached cake turning plate, seen in Figs. 1 and 2.

The cake turner seen in Fig. 1 comprises a comparatively thin metal plate —1— having portions thereof cut and pressed up, forming integral loops —2— which receive a thick shank or knife blade —3— having a handle —4— whereby the blade —1— may be manipulated in turning cakes and for other uses to which the device may be adapted. In this particular device shown in Figs. 1, 2, and 3, the central portion or body of the blade —1— is provided with one or more pairs of transverse slits —5— running transversely and diagonally through the main body of the blade, a distance corresponding to the width of the shank or knife blade —3— which is to be inserted therethrough when the portions between each pair of slits is pressed up beyond the body of the blade —1— to form the loops —2—, the intention being to make the openings through the loops of just sufficient width to permit the knife blade —3— to be inserted through said loops and frictionally held thereby, so that the parts of the completed device may be easily and quickly assembled and manipulated without liability of detaching the blades from each other under ordinary usage as a cake turner or chopping device.

In order to render this device of greater utility as a vegetable and meat chopper, a plurality of, in this instance two, loops —2— are formed in the blade —1— with their openings therethrough in alinement to and at an angle with the longitudinal axis of the blade —1—, so that when the shank or blade —3— is inserted in the loops it will also be disposed at an angle with the longitudinal axis of the blade —1— as best seen in Fig. 1. When the device is thus constructed, one end of the shank or blade —3— having the handle thereon extends some distance beyond and above one end of one of the longitudinal edges of the blade —1—, while the opposite or lower longitudinal edge is preferably beveled and sharpened forming a straight knife edge —6—, which, in this particular instance is parallel with the upper longitudinal edge of said blade —1—.

It is now evident that the loops —2— are pressed beyond one of the faces of the blade —1—, forming comparatively shallow openings between the inner faces and the plane of the adjacent faces of the blade —1—, said openings conforming to the shape of the shank or blade —3— which is inserted therethrough so that when said shank is inserted it will be firmly held thereby. These blades —1— may be made and sold as separate articles of manufacture with the loops —2— —2— formed therein, and adapted to receive the blade of an ordinary case knife with which every household is provided, and at the same time by making the cake turning blade and manipulating shank detachable from each other, they may be readily cleaned, and therefore easily maintained in a perfect sanitary condition.

What I claim is:

An implement of the class described comprising a plate having two sets of spaced transverse clefts arranged in pairs spaced apart and spaced from the ends of the plate, said clefts extending transversely of the length of the plate and at an angle to the longitudinal edges and ends of said plate, the metal between each pair of the clefts upset to form spaced sockets for receiving a supporting handle with the lower surface of the handle bearing upon the plate between the sockets and likewise bearing upon the plate at each side of each pair of clefts, the said handle extending across the plate at an angle and engaging the plate from one corner thereof adjacent one longitudinal edge to the termination of the handle adjacent the opposite longitudinal edge of the plate.

In witness whereof I have hereunto set my hand this 22d day of January 1907.

S SPENCER ECCLESTON.

Witnesses:
M. M. NOTT,
HOWARD P. DENISON.